US011913762B1

(12) United States Patent
Current et al.

(10) Patent No.: US 11,913,762 B1
(45) Date of Patent: *Feb. 27, 2024

(54) MULTI-LEVEL NETWORKED ORDNANCE SYSTEM

(71) Applicant: Pacific Scientific Energetic Materials Company (California) LLC, Hollister, CA (US)

(72) Inventors: Peter J. Current, Castaic, CA (US); Michael R. Hathaway, Valencia, CA (US)

(73) Assignee: Pacific Scientific Energetic Materials Company (California) LLC, Hollister, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/571,685

(22) Filed: Jan. 10, 2022

Related U.S. Application Data

(60) Division of application No. 16/400,912, filed on May 1, 2019, now Pat. No. 11,220,359, which is a continuation of application No. 15/805,066, filed on Nov. 6, 2017, now Pat. No. 10,309,758, which is a continuation of application No. 15/424,721, filed on Feb. 3, 2017, now Pat. No. 9,810,515.

(51) Int. Cl.
| | |
|---|---|
| F42B 15/36 | (2006.01) |
| B64G 1/64 | (2006.01) |
| F42D 1/045 | (2006.01) |
| F42D 1/05 | (2006.01) |
| F42C 15/42 | (2006.01) |
| F42C 15/40 | (2006.01) |

(52) U.S. Cl.
CPC ............. *F42B 15/36* (2013.01); *B64G 1/64* (2013.01); *B64G 1/641* (2013.01); *B64G 1/645* (2013.01); *F42C 15/40* (2013.01); *F42C 15/42* (2013.01); *F42D 1/045* (2013.01); *F42D 1/05* (2013.01)

(58) Field of Classification Search
CPC .......... B64G 1/10; B64G 1/403; B64G 1/428; B64G 1/64; B64G 1/641; B64G 1/645; F42B 15/36; F42B 15/38; F42D 1/05; F42D 1/045; F42C 15/40; F42C 15/42; F02K 9/00; F02K 9/95
USPC ......... 102/377, 378, 206, 215, 217; 89/1.14; 244/172.5, 173.3
See application file for complete search history.

(56) References Cited

U.S. PATENT DOCUMENTS

| | | |
|---|---|---|
| 5,152,482 A | 10/1992 | Perkins et al. |
| 5,271,582 A | 12/1993 | Perkins et al. |
| 6,152,011 A | 11/2000 | Ivy et al. |
| 6,173,651 B1 | 1/2001 | Pathe et al. |
| 6,275,756 B1 | 8/2001 | Griggs et al. |

(Continued)

*Primary Examiner* — James S Bergin
(74) *Attorney, Agent, or Firm* — Perkins Coie LLP

(57) ABSTRACT

A networked electronic ordnance system is provided. The system includes a first plurality of pyrotechnic devices connected to a first network bus. The system further includes a first bus controller connected to the first network bus. The system further includes a second plurality of pyrotechnic devices connected to a second network bus. The system further includes a second bus controller connected to the second network bus. The system further includes a bus interface circuit connected to the first bus controller by a first electrical connection and connected to the second bus controller by a second electrical connection.

20 Claims, 11 Drawing Sheets

(56) References Cited

U.S. PATENT DOCUMENTS

| | | |
|---|---|---|
| 6,283,227 B1 | 9/2001 | Lerche et al. |
| 6,300,764 B1 | 10/2001 | Kelly |
| 6,490,976 B1 * | 12/2002 | Fisher .................... F42D 1/055 102/206 |
| 6,584,907 B2 | 7/2003 | Boucher et al. |
| 6,588,342 B2 | 7/2003 | Griggs, III et al. |
| 6,622,628 B2 * | 9/2003 | Fisher .................... F42D 1/055 102/206 |
| 7,017,494 B2 | 3/2006 | Kouznetsov |
| 7,086,334 B2 | 8/2006 | Jennings, III |
| 7,261,028 B2 | 8/2007 | Devries et al. |
| 7,484,693 B2 | 2/2009 | Eng |
| 7,530,311 B2 | 5/2009 | Koekemoer et al. |
| 7,644,661 B1 | 1/2010 | Nelson et al. |
| 7,752,970 B2 | 7/2010 | Nelson et al. |
| 7,762,189 B2 | 7/2010 | Ritchie et al. |
| 8,006,938 B2 | 8/2011 | Behrens et al. |
| 8,136,448 B2 * | 3/2012 | Nelson .................... F42D 1/05 102/215 |
| 8,213,151 B2 | 7/2012 | Nelson et al. |
| 8,994,515 B2 | 3/2015 | Guyon et al. |
| 9,127,918 B2 | 9/2015 | DeVries et al. |
| 9,518,454 B2 | 12/2016 | Current et al. |
| 9,810,515 B1 | 11/2017 | Current et al. |
| 10,309,758 B1 | 6/2019 | Current et al. |
| 10,518,907 B2 | 12/2019 | Novotney et al. |
| 10,549,869 B2 | 2/2020 | Novotney et al. |
| 11,220,359 B1 * | 1/2022 | Current .................... F23Q 21/00 |
| 2005/0183605 A1 | 8/2005 | Bishop et al. |
| 2005/0188871 A1 | 9/2005 | Forman et al. |
| 2008/0156218 A1 | 7/2008 | Ritchie et al. |
| 2009/0314175 A1 | 12/2009 | Nelson et al. |
| 2011/0011293 A1 | 1/2011 | Nelson et al. |

\* cited by examiner

MULTI-LEVEL NETWORKED ORDNANCE SYSTEM

CROSS-REFERENCE TO RELATED APPLICATION

The present application is a division of U.S. patent application Ser. No. 16/400,912, filed May 1, 2019, issued as U.S. Pat. No. 11,220,359, which is a continuation of U.S. patent application Ser. No. 15/805,066 filed Nov. 6, 2017, issued as U.S. Pat. No. 10,309,758, which is a continuation of U.S. patent application Ser. No. 15/424,721, filed Feb. 3, 2017, for "Multi-Level Networked Ordnance System", issued as U.S. Pat. No. 9,810,515.

TECHNICAL FIELD

The present disclosure relates to networked ordnance systems, including networked systems of pyrotechnic devices.

BACKGROUND

Pyrotechnic devices play an increasingly important role in aerospace vehicles and systems such as rockets, aircraft, and spacecraft. As an example, the number of pyrotechnic devices used on a typical missile has increased over the years from less than ten to as many as two hundred or more. The additional pyrotechnic devices can be used for several purposes. For example, multiple lower-powered initiators can be used in place of a single higher-powered initiator to provide flexibility in the amount of force that can be generated at a single location on the vehicle. However, the use of additional pyrotechnic devices carries with it the burden of additional infrastructure within the vehicle or system using these devices. As the number of pyrotechnic devices in a vehicle or system increases, several other things increase as well, such as cabling length, cable quantity, weight, number of parts, power usage, system complexity, manufacturing time and system cost. In an environment such as a rocket or missile, weight and volume are at a premium, and an increase in pyrotechnic system weight and volume presents packaging and weight management problems which can require significant engineering time to solve.

Some approaches have been developed to address these challenges with deploying a large number of pyrotechnic devices in a vehicle or system. FIG. 1 illustrates an approach using a bus controller 102, a cable network 103, and devices 104. In this deployment, the devices 104 share the cable network 103 in order to communicate with the bus controller 102. The bus controller 102 can use the cable network 103 to control the device 104, such as the firing of a pyrotechnic device provided as part of one of the pyrotechnic devices 104. Using such a deployment, the infrastructure needed to support the numerous devices can be reduced.

SUMMARY

According to some embodiments of the present disclosure, a networked electronic ordnance system is provided. The system includes a first plurality of pyrotechnic devices connected to a first network bus. The system further includes a first bus controller connected to the first network bus. In such embodiments, the first bus controller is configured to transmit commands to the first plurality of pyrotechnic devices over the first network bus in order to control activation of the first plurality of pyrotechnic devices. The system further includes a second plurality of pyrotechnic devices connected to a second network bus. The system further includes a second bus controller connected to the second network bus. In such embodiments, the second bus controller is configured to transmit commands to the second plurality of pyrotechnic devices over the second network bus in order to control activation of the second plurality of pyrotechnic devices. The system further includes a bus interface circuit connected to the first bus controller by a first electrical connection and connected to the second bus controller by a second electrical connection. In such embodiments, the bus interface circuit is configured to transmit commands to the first bus controller over the first electrical connection. In such embodiments, the bus interface circuit is configured to transmit commands to the second bus controller over the second electrical connection.

In some embodiments, the system further includes a storage circuit connected to the bus interface circuit. In such embodiments, the storage circuit is configured to store information identifying a pyrotechnic device of the first plurality of pyrotechnic devices or of the second plurality of pyrotechnic devices that is a next pyrotechnic device to be activated.

In some embodiments, when the next pyrotechnic device to be activated is a pyrotechnic device of the first plurality of pyrotechnic devices, the bus interface circuit is configured to send a command to the first bus controller over the first electrical connection. In such embodiments, when the next pyrotechnic device to be activated is a pyrotechnic device of the second plurality of pyrotechnic devices, the bus interface circuit is configured to send a command to the second bus controller over the second electrical connection.

In some embodiments, the bus interface circuit is further configured to receive an input command from a command source. In such embodiments, the bus interface circuit is further configured to determine whether the input command pertains to a pyrotechnic device of the first plurality of pyrotechnic devices or a pyrotechnic device of the second plurality of pyrotechnic devices.

In some embodiments, the bus interface circuit is further configured to transmit a command based on the input command to the first bus controller when the input command pertains to a pyrotechnic device of the first plurality of pyrotechnic devices. In such embodiments, the bus interface circuit is further configured to transmit a command based on the input command to the second bus controller when the input command pertains to a pyrotechnic device of the second plurality of pyrotechnic devices.

In some embodiments, the bus interface circuit is further configured to receive an input command from a command source. In such embodiments, the bus interface circuit is further configured to determine an address value for a pyrotechnic device of the first plurality of pyrotechnic devices or of the second plurality of pyrotechnic devices to which the input command pertains.

In some embodiments, the bus interface circuit is further configured to transmit a command based on the input command and including the address value to the first bus controller when the input command pertains to a pyrotechnic device of the first plurality of pyrotechnic devices. In such embodiments, the bus interface circuit is further configured to transmit a command based on the input command and including the address value to the second bus controller when the input command pertains to a pyrotechnic device of the second plurality of pyrotechnic devices.

In some embodiments, the first bus controller transmits a command to a pyrotechnic device of the first plurality of pyrotechnic devices over the first network bus based on receiving a command from the bus interface circuit over the first electrical connection.

In some embodiments, the bus interface circuit transmits an activation command to the first bus controller over the first electrical connection when the activation command pertains to a pyrotechnic device of the first plurality of pyrotechnic devices.

In some embodiments, the first network bus and the second network bus share a logical address space.

In some embodiments, a first pyrotechnic device of the first plurality of pyrotechnic devices and a second pyrotechnic device of the second plurality of pyrotechnic device have a same logical address value. In such embodiments, the first pyrotechnic device is different from the second pyrotechnic device.

In some embodiments, the system further includes a third plurality of pyrotechnic devices connected to a third network bus. In such embodiments, the system further includes a third bus controller connected to the third network bus. In such embodiments, the third bus controller is configured to transmit commands to the third plurality of pyrotechnic devices over the third network bus in order to control activation of the third plurality of pyrotechnic devices. In such embodiments, the bus interface circuit is connected to the third bus controller by a third electrical connection. In such embodiments, the bus interface circuit is configured to transmit commands to the third bus controller over the third electrical connection.

In some embodiments, the system further includes a fourth plurality of pyrotechnic devices connected to a fourth network bus. In such embodiments, the system further includes a fourth bus controller connected to the fourth network bus. In such embodiments, the fourth bus controller is configured to transmit commands to the fourth plurality of pyrotechnic devices over the fourth network bus in order to control activation of the fourth plurality of pyrotechnic devices. In such embodiments, the bus interface circuit is connected to the fourth bus controller by a fourth electrical connection. In such embodiments, the bus interface circuit is configured to transmit commands to the fourth bus controller over the fourth electrical connection.

In some embodiments, the first electrical connection is a hardwired connection from an output pin of the bus interface circuit to an input of the first bus controller.

In some embodiments, the bus interface circuit is a field-programmable gate array.

In some embodiments, at least one pyrotechnic device of the first plurality of pyrotechnic devices is configured to release a separation nut connected to a satellite.

In some embodiments, all pyrotechnic devices of the first plurality of pyrotechnic devices are different from all pyrotechnic devices of the second plurality of pyrotechnic devices.

In some embodiments, the first network bus is different from the second network bus.

In some embodiments, the first network bus is different from the second network bus.

In some embodiments, the first electrical connection is different from the second electrical connection.

According to some embodiments of the present disclosure, a method for providing a networked electronic ordnance system is provided. The method includes providing a first plurality of pyrotechnic devices connected to a first network bus. The method further includes providing a first bus controller connected to the first network bus. In such embodiments, the first bus controller is configured to transmit commands to the first plurality of pyrotechnic devices over the first network bus in order to control activation of the first plurality of pyrotechnic devices. The method further includes providing a second plurality of pyrotechnic devices connected to a second network bus. The method further includes providing a second bus controller connected to the second network bus. In such embodiments, the second bus controller is configured to transmit commands to the second plurality of pyrotechnic devices over the second network bus in order to control activation of the second plurality of pyrotechnic devices. The method further includes providing a bus interface circuit connected to the first bus controller by a first electrical connection and connected to the second bus controller by a second electrical connection. In such embodiments, the bus interface circuit is configured to transmit commands to the first bus controller over the first electrical connection. In such embodiments, the bus interface circuit is configured to transmit commands to the second bus controller over the second electrical connection.

According to some embodiments of the present disclosure, a method for controlling a networked electronic ordnance system containing an interface circuit, a plurality of pyrotechnic devices, a plurality of bus controllers, and a plurality of network buses is provided. The method includes receiving an input command at a bus interface circuit. The method further includes selecting a destination bus controller from a first bus controller and a second bus controller. The method further includes transmitting at least a portion of the input command as an interface command from the bus interfaced circuit to the destination bus controller. The method further includes receiving the interface command at the destination bus controller. The method further includes selecting a destination pyrotechnic device connected to the destination bus controller by a first network bus. The method further includes transmitting at least a portion of the interface command as a bus command from the destination bus controller to the destination pyrotechnic device. The method further includes receiving the bus command at the destination pyrotechnic device. The method further includes activating the destination pyrotechnic device based on receiving the bus command.

According to some embodiments of the present disclosure, a system is provided. The system includes a first device connected to a first network bus. The system further includes a first bus controller connected to the first network bus. In such embodiments, the first bus controller is configured to transmit commands to the first device over the first network bus in order to control activation of the first device. The system further includes a second device connected to a second network bus. The system further includes a second bus controller connected to the second network bus. In such embodiments, the second bus controller is configured to transmit commands to the second device over the second network bus in order to control activation of the second device. The system further includes a bus interface circuit connected to the first bus controller and the second bus controller. In such embodiments, the bus interface circuit is configured to selectively transmit a command to the first bus controller or the second bus controller. In such embodiments, the bus interface circuit is configured to transmit the command to the first bus controller if the command is destined for the first device. In such embodiments, the bus interface circuit is configured to transmit the command to the second bus controller if the command is destined for the second device.

DETAILED DESCRIPTION

Figure 1:
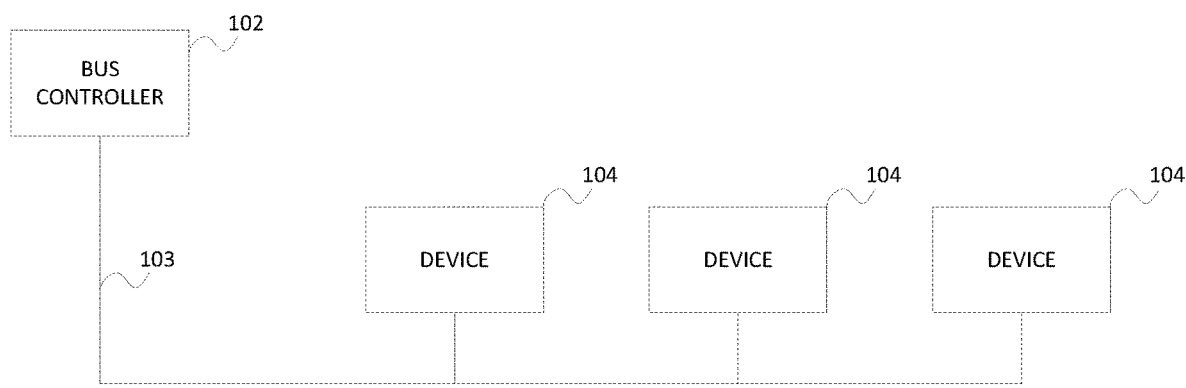
FIG. 1 is a block diagram of a networked ordnance system.

While the networked ordnance system of FIG. 1 addresses the challenges with using a large number of pyrotechnic devices in some vehicles or systems, the present inventors recognized that, in some situations, the number of ordnance devices used in a vehicle or system can be so large that a single bus for connecting all of those ordnance devices can be problematic or lead to a poor design. For example, in a system with discrete physical sectors, challenges can arise in physically installing a single bus running through all of those sectors (e.g., only a small physical interface between the sectors limiting the space available for running physical cables). As another example, in such a system with discrete physical sectors, installing a single bus running through all of those sectors can create undesired dependencies between those sectors (e.g., a failure mode in one sector can undesirably cause a failure in another sector that is intended to be largely independent in operation and failure). As another example, in some bus systems, the logical address space available to uniquely identify each ordnance device can be smaller than the total number of ordnance devices used in the vehicle or system. Addressing these problems identified by the present inventors and providing other technical benefits, a multi-level networked ordnance system is now disclosed.

Figure 2:
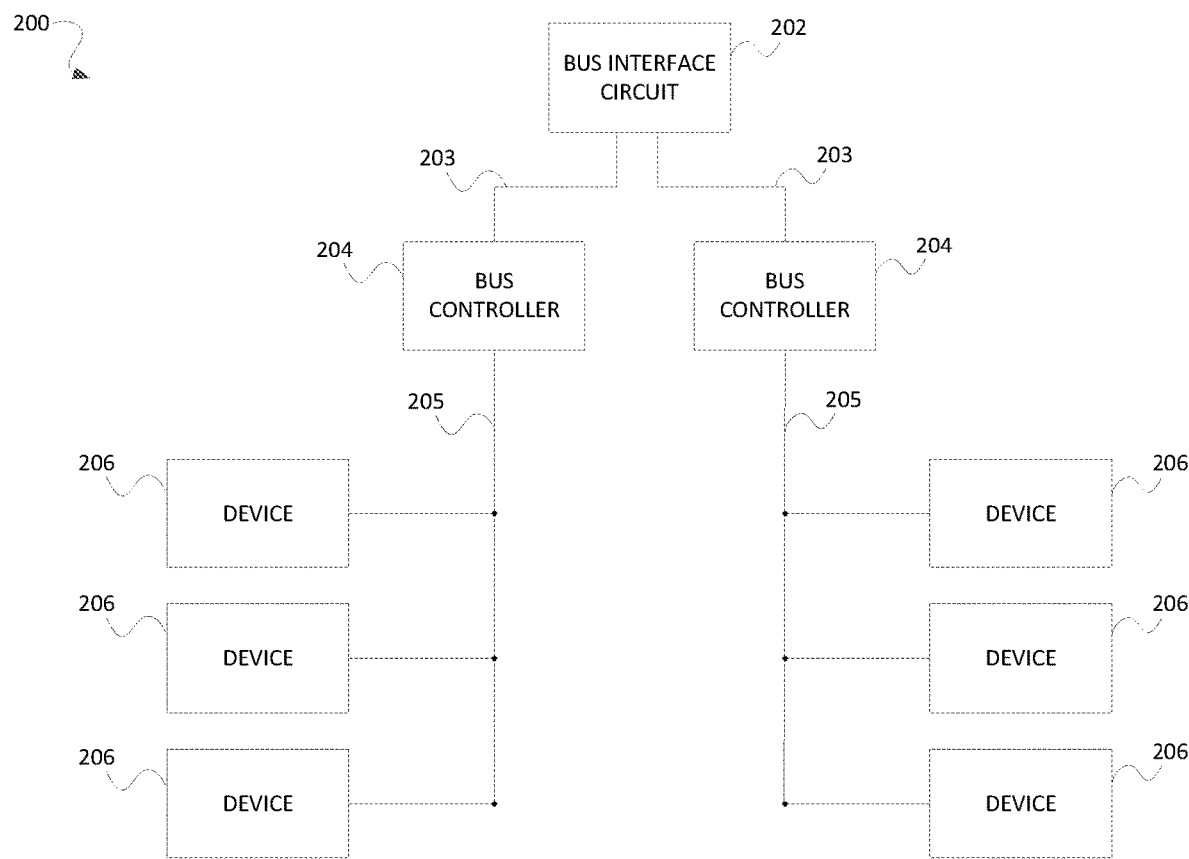
FIG. 2 is a block diagram of a multi-level networked ordnance system according to some embodiments of the present disclosure.

FIG. 2 is a block diagram of a multi-level networked ordnance system 200 according to some embodiments of the present disclosure. The system 200 includes a bus interface circuit 202, connections 203, bus controllers 204, buses 205, and ordnance devices 206.

In some embodiments, a bus controller 204 can communicate with numerous ordnance devices 206 using a bus 205. The bus controller 204 can be provided as a hardware and/or software device configured to receive a command over the connection 203 and transmit the same or a related command over the bus 205. The bus controller 204 can transmit commands over the bus 205 in order to control the activation of the ordnance devices 206. For example, the bus controller 204 can cause a pyrotechnic device provided as part of an ordnance device 206 to fire by sending a "fire" command and a logical address for the desired ordnance device 206 across the bus 205. In some embodiments, the bus controller can be provided as an application-specific integrated circuit. In some embodiments, the bus 205 can be provided as a physical cable connecting a bus controller 204 with numerous ordnance devices 206. In some embodiments, the ordnance devices 206 can be provided as a combination of a pyrotechnic activator and a hardware and/or software controller. The hardware/software controller can be configured to cause the pyrotechnic activator to fire in response to a command received across the bus 205. In some embodiments, the ordnance devices 206 can include other activators, such as magnetic actuators. In some embodiments, the ordnance devices 206 can include a smart connector.

In some embodiments, a bus controller 204, a bus 205, and numerous ordnance devices 206 can operate as a networked ordnance system as described previously (e.g., as described in U.S. Pat. No. 8,136,448). In such embodiments, the bus controller 204, the bus 205, and the ordnance devices 206 can be provided as described previously with respect to those components (e.g., as described in U.S. Pat. No. 8,136,448). The description in U.S. Pat. No. 8,136,448 is incorporated by reference in its entirety.

The bus interface circuit 202 can communicate with the bus controllers 204 using the connections 203. The bus interface circuit 202 can be provided as a hardware and/or software device configured to select which bus controller 204 should receive a command, and then transmit the command on the connection 203 corresponding to the selected bus controller 204. In some embodiments, the bus interface circuit 202 can be provided as a field-programmable gate array. In some embodiments, the connections 203 can be provided as electrical connections (e.g., a conducting line along a computer chip; a metallic wire) configured to carry an electronic signal (e.g., a serial data signal; a baseband signal).

Figure 3:
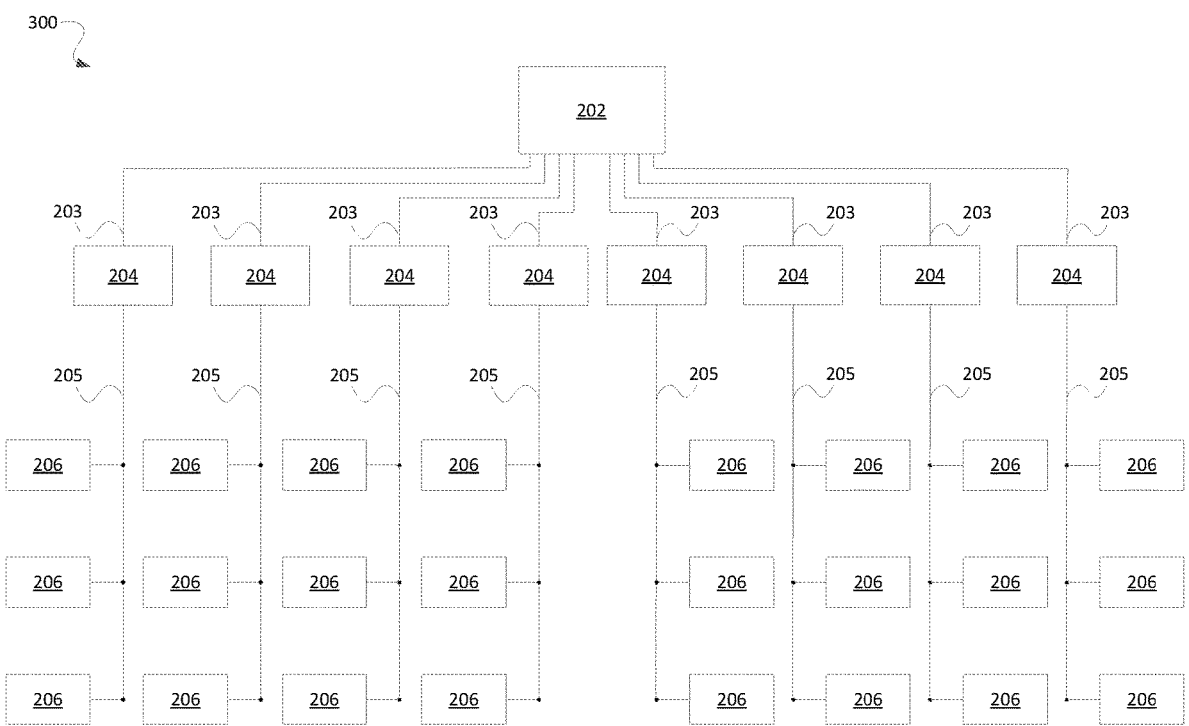
FIG. 3 is a block diagram of a multi-level networked ordnance system according to some embodiments of the present disclosure.

FIG. 3 is a block diagram of a multi-level networked ordnance system 300 according to some embodiments of the present disclosure. The system 300 includes a bus interface circuit 202, connections 203, bus controllers 204, buses 205, and ordnance devices 206, as described previously.

In contrast with the system 200 of FIG. 2, the system 300 of FIG. 3 includes eight bus controllers 204 with which the bus interface circuit 202 communicates. Therefore, even though each bus controller 204 in system 300 communicates with the same number of ordnance devices as in the system 200 (i.e., three), the system 300 contains more total ordnance devices 206 (i.e., 24 ordnance devices 206 in system 300 compared to 6 ordnance devices 206 in system 200). In various embodiments, the systems 200 and 300 can be modified to include other numbers of bus controllers 204 in communication with the bus interface circuit 202 (e.g., three, four, five, six, seven, ten, twenty, one hundred).

Figure 4:
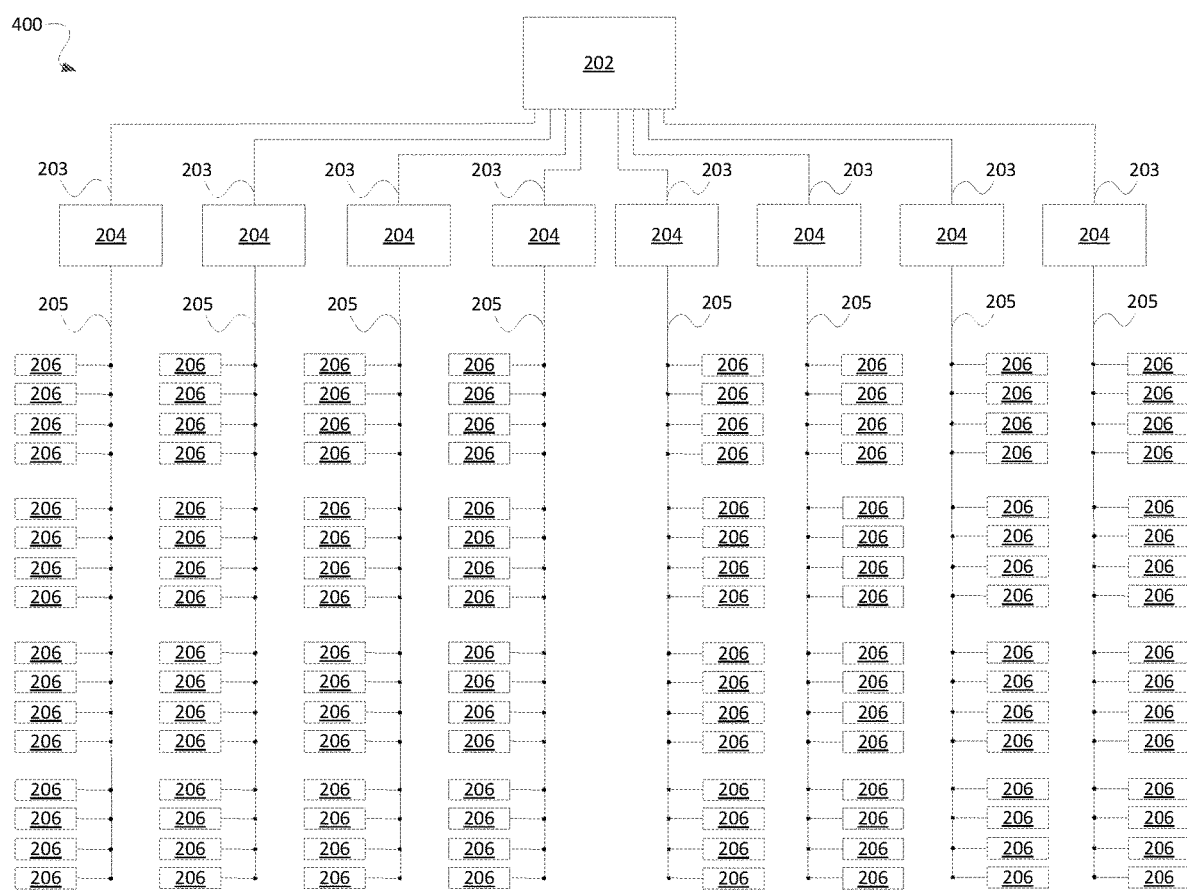
FIG. 4 is a block diagram of a multi-level networked ordnance system according to some embodiments of the present disclosure.

FIG. 4 is a block diagram of a multi-level networked ordnance system 400 according to some embodiments of the present disclosure. The system 400 includes a bus interface circuit 202, connections 203, bus controllers 204, buses 205, and ordnance devices 206, as described previously.

In contrast with the system 300 of FIG. 3, the system 400 of FIG. 4 includes sixteen ordnance devices connected to each bus 205. Therefore, even though the bus interface circuit 202 of the system 400 communicates with the same number of bus controllers 204 as in the system 300 (i.e., eight), the system 400 contains more total ordnance devices 206 (i.e., 128 ordnance devices 206 in system 400 compared to 24 ordnance devices 206 in system 300). In various embodiments, the systems 200, 300, and 400 can be modified to include other numbers of ordnance devices in communication with each bus controller 204 (e.g., one, two, four, five, six, seven, eight, nine, ten, twenty, one hundred). In some embodiments, the various buses 205 are not connected to the same number of ordnance devices 206. For example, a first bus 205 can connect a first bus driver 204 to four ordnance devices 206, while a second bus 206 can connect a second bus controller 204 to eight ordnance devices 206.

Figure 5:
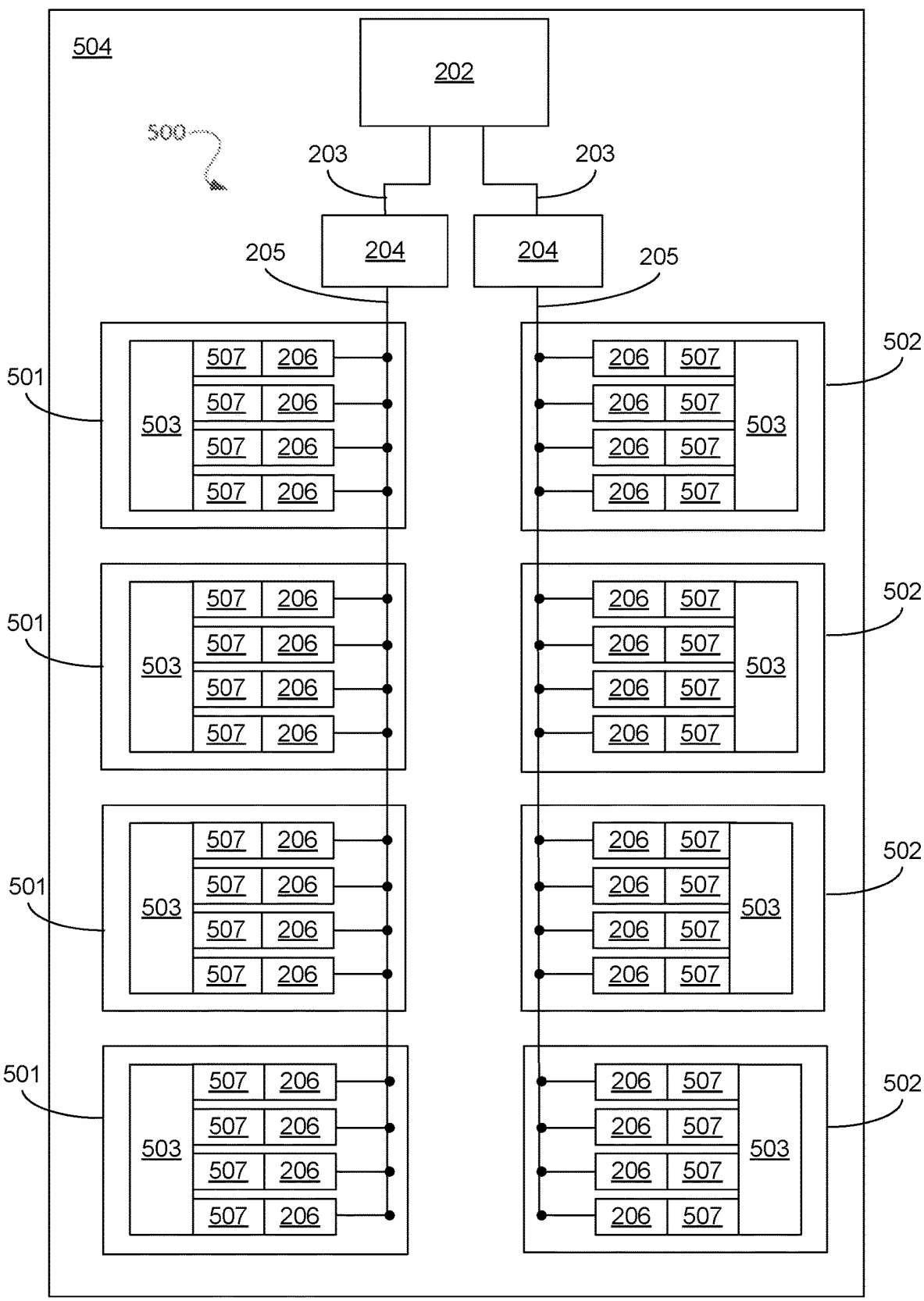
FIG. 5 is a block diagram of a multi-level networked ordnance system according to some embodiments of the present disclosure.

FIG. 5 is a block diagram of a multi-level networked ordnance system 500 according to some embodiments of the present disclosure. The system 500 includes a bus interface circuit 202, connections 203, bus controllers 204, buses 205, and ordnance devices 206, as described previously. In addition, the system 500 includes groupings 501 and 502.

The groupings 501 and 502 can reflect the arrangement of ordnance devices 206 into groups. In some embodiments, the groupings 501 and 502 can be provided according to a physical layout of the vehicle or system in which the system 500 is provided.

For example, consider a case where the system 500 is installed in a rocket in order to control the thrusters of the rocket. In that case, each of the groupings 501 can correspond to a separate first-stage thruster (e.g., each of four thrusters used to initially propel the rocket), and each of the groupings 502 can correspond to a separate second-stage thruster (e.g., each of four thrusters used to propel the rocket after the first-stage thrusters have been exhausted). In such an example, each ordnance device 206 can correspond to a separate firing mechanism for the thruster with which its grouping 501 or 502 is associated.

As another example, consider a case where the system 500 is installed in a satellite deployment vehicle (e.g., a limited-life spacecraft that carries multiple satellite payloads into space and deploys them in orbit). In that case, each of the groupings 501 and 502 can correspond to a separate satellite 503. In such an example, each ordnance device 206 can correspond to a separate pyrotechnic device used to break a coupling 507 between the corresponding satellite 503 and the satellite deployment vehicle 504 (e.g., with each satellite coupled to the satellite deployment vehicle by four pyrotechnically-releasable couplings 507).

In some embodiments, the bus controllers 204 and buses 205 can additionally be arranged according to a physical layout of the vehicle or system in which the system 500 is provided. For example, consider a case in which a satellite deployment vehicle is constituted by a number of physical sectors called rails, each rail providing mounting points for four satellites. In such a case, each rail can be a substantially distinct module, and each satellite deployment vehicle can be modified to include various numbers of rails. In such a case, a separate bus controller 204 and bus 205 can be provided for each rail. In such a case, each grouping 501 and 502 can be a group of pyrotechnically-releasable couplings for a single satellite. In this way and in other ways consistent with the present disclosure, both the bus controllers 204 and buses 205, and/or, the groupings 501 and 502 can be provided corresponding to a physical layout of the vehicle or system in which they are installed.

Figure 6:
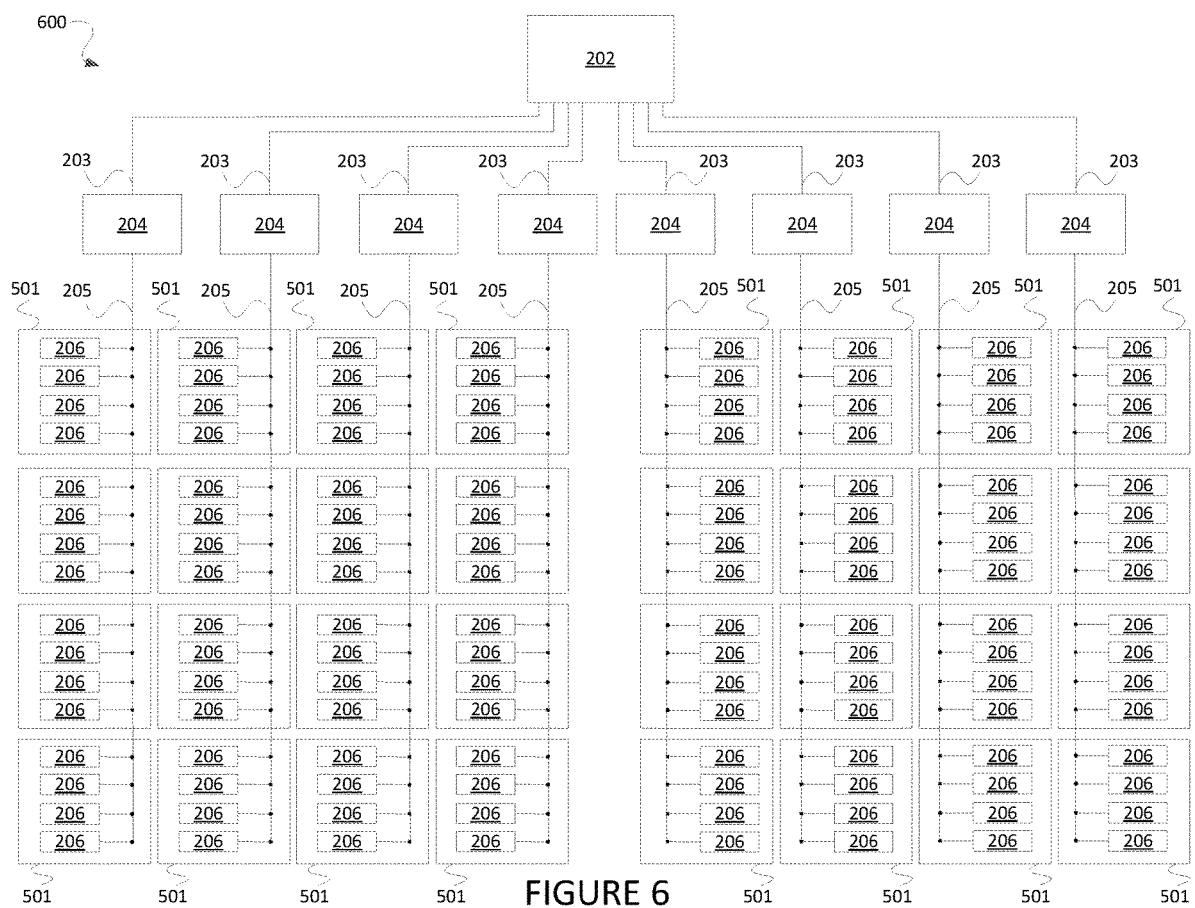
FIG. 6 is a block diagram of a multi-level networked ordnance system according to some embodiments of the present disclosure.

FIG. 6 is a block diagram of a multi-level networked ordnance system 600 according to some embodiments of the present disclosure. The system 600 includes a bus interface circuit 202, connections 203, bus controllers 204, buses 205, and ordnance devices 206, and groupings 501, as described previously.

In contrast with the system 500 of FIG. 5, the system 600 of FIG. 6 includes groupings 501 for a larger number of ordnance devices 206. In some embodiments, the systems 500 and 600 can be modified to use groupings 501 and 502 of different numbers of ordnance device 206 (e.g., groupings 501 of two ordnance devices 206; groupings 501 of eight ordnance devices 206; groupings 501 of twenty ordnance devices 206). In some embodiments, the systems 500 and 600 can be modified to use groupings 501 and 502 of varying numbers of ordnance device 206 (e.g., groupings 501 of two ordnance devices 206 and groupings 502 of eight ordnance devices 206).

The systems 200, 300, 400, 500, and 600 can improve over existing networked ordnance systems in various ways.

As a first improvement, the systems 200, 300, 400, 500, and 600 can prevent a logical address space of the networked ordnance systems from limiting the number of ordnance device 206 that can be included in a vehicle or system. In some embodiments, a bus controller 204 can use a logical address space to identify which ordnance device 206 on its bus 205 is the target of a command transmitted on the bus 205. For example, consider a case where an address space defined by a three bit sequence. In such a case, the bus controller 204 can uniquely identify and thus uniquely command up to eight ordnance devices 206 (i.e., $2^3=8$ unique address values). In such a case, the bus controller 204 could properly function in a system using three ordnance devices 206 on a bus 205 (e.g., as in FIG. 1), but the bus controller 204 could not properly function in a system using sixteen ordnance devices 206 on a bus 205 (e.g., as in systems 400 and 600). Furthermore, modification of the logical address space can be undesirable due to engineering and practical limitations (e.g., limit on address length due to the contention algorithms used for the shared bus 205; difficulty in reprogramming already-manufactured ordnance devices 206 and bus controllers 204). Therefore, a vehicle or system may either be limited in the number of ordnance devices 206 that it can use (e.g., to the detriment of the operation of that vehicle or system), or the vehicle or system may be precluded from using a networked ordnance system (e.g., with the loss of benefits described previously for such systems).

However, in the systems 200, 300, 400, 500, and 600, the bus controllers 204 can continue to support only a limited number of ordnance devices (based on a predefined logical address space), while the overall systems 200, 300, 400, 500, and 600 can use a greatly expanded number of ordnance devices 206. In some embodiments, this can be achieved by having each bus controller 204 use the same logical name space as all of the other bus controllers 204 (e.g., the same three-bit address sequence). While this would create ambiguity in the addressing of ordnance device 206 if all of the ordnance device 206 of the overall systems 200, 300, 400, 500, and 600 were on a single bus, this ambiguity can be avoided because each logical address value used by each bus controller 204 is locally unique (i.e., to each bus controller 204's bus 205) even if not globally unique (i.e., across all bus controllers 204 and buses 205).

For example, if the logical address space supported by a bus controller 204 in the system 600 is sixteen unique values (e.g., a four bit address), then the system 600 can support a total number of ordnance devices 206 calculated as: 16× (number of bus controllers). If using the illustration of FIG. 6, the system 600 could support up to 128 ordnance devices 206 even though any single bus controller can only support 16 ordnance devices 206.

As a second improvement, the systems 200, 300, 400, 500, and 600 can prevent installation problems arising from installing a long, single bus across an entire vehicle or system in which the systems 200, 300, 400, 500, and 600 are provided. As an example, consider a case in which vehicle or system using the systems 200, 300, 400, 500, and 600 is arranged as a number of distinct sectors that are only connected by small physical couplings (e.g., thrusters on a rocket; satellite mounting rails on a satellite deployment vehicle). In such a case, arranging a single physical cable to serve as a single bus 205 for all of the ordnance devices 206 may be difficult or impossible. The use of multiple, separate buses 205 as in systems 200, 300, 400, 500, and 600 can allow greater flexibility in how the physical cables are arranged in the vehicle or system.

As a third improvement, the systems 200, 300, 400, 500, and 600 can prevent communications problems arising from installing a long, single bus across an entire vehicle or system in which the systems 200, 300, 400, 500, and 600 are provided. As an example, consider a case in which vehicle or system using the systems 200, 300, 400, 500, and 600 is arranged as a number of distinct sectors (e.g., thrusters on a rocket; satellite mounting rails on a satellite deployment vehicle). In such a case, a typical contention window algorithm can be used for communications on the bus 205. Under many such algorithms, each device (e.g., bus controller 204 and ordnance devices 206) must wait a minimum amount of time after the end of one transmission on the bus before beginning a new transmission on the bus. This minimum wait time is roughly calculated as the physical length of the bus cable divided by the speed of signal propagation on the bus. This reflects the fact that a device must wait at least long enough so that a transmission started by the farthest-distant device on the same bus would be observed by the device that is waiting to transmit. Therefore, as the length of the shared bus cable increases, the length waiting time between transmissions also increases. By using multiple, separate buses 205, the systems 200, 300, 400, 500, and 600 can use shorter physical lengths for the buses 205 and thus avoid this increase in bus communication delays.

As a fourth improvement, the systems 200, 300, 400, 500, and 600 can prevent failure isolation problems arising from installing a long, single bus across an entire vehicle or system in which the systems 200, 300, 400, 500, and 600 are provided. As an example, consider a case in which vehicle or system using the systems 200, 300, 400, 500, and 600 is arranged as a number of distinct sectors (e.g., thrusters on a rocket; satellite mounting rails on a satellite deployment vehicle). In such a case, the vehicle or system can be designed so that each sector is isolated from the other sectors for failure purposes. That is, the vehicle or system can be designed so that the failure of operation of one sector does not affect the operation of other sectors. But the use of a single bus to connect all ordnance devices 206 across all sectors can frustrate this failure isolation design. For example, if physical damage is suffered by a first sector (e.g., improper release of a satellite causes a physical impact and structural damage), that damage can disable the bus 205 (e.g., by creating an electrical short; causing intermittent electrical current to be fed onto the cable). Disabling the bus 205 can then prevent ordnance devices 206 in other sectors from receiving commands across the bus, thereby potentially causing a failure of the entire vehicle or system. In some embodiments, the systems 200, 300, 400, 500, and 600 can avoid this issue, such as providing a separate bus controller 204 and bus 205 for each sector. Thereby, a failure of a bus controller 204 or bus 205 in one sector will not prevent the operation of ordnance devices 206 in other sectors.

Figure 7:
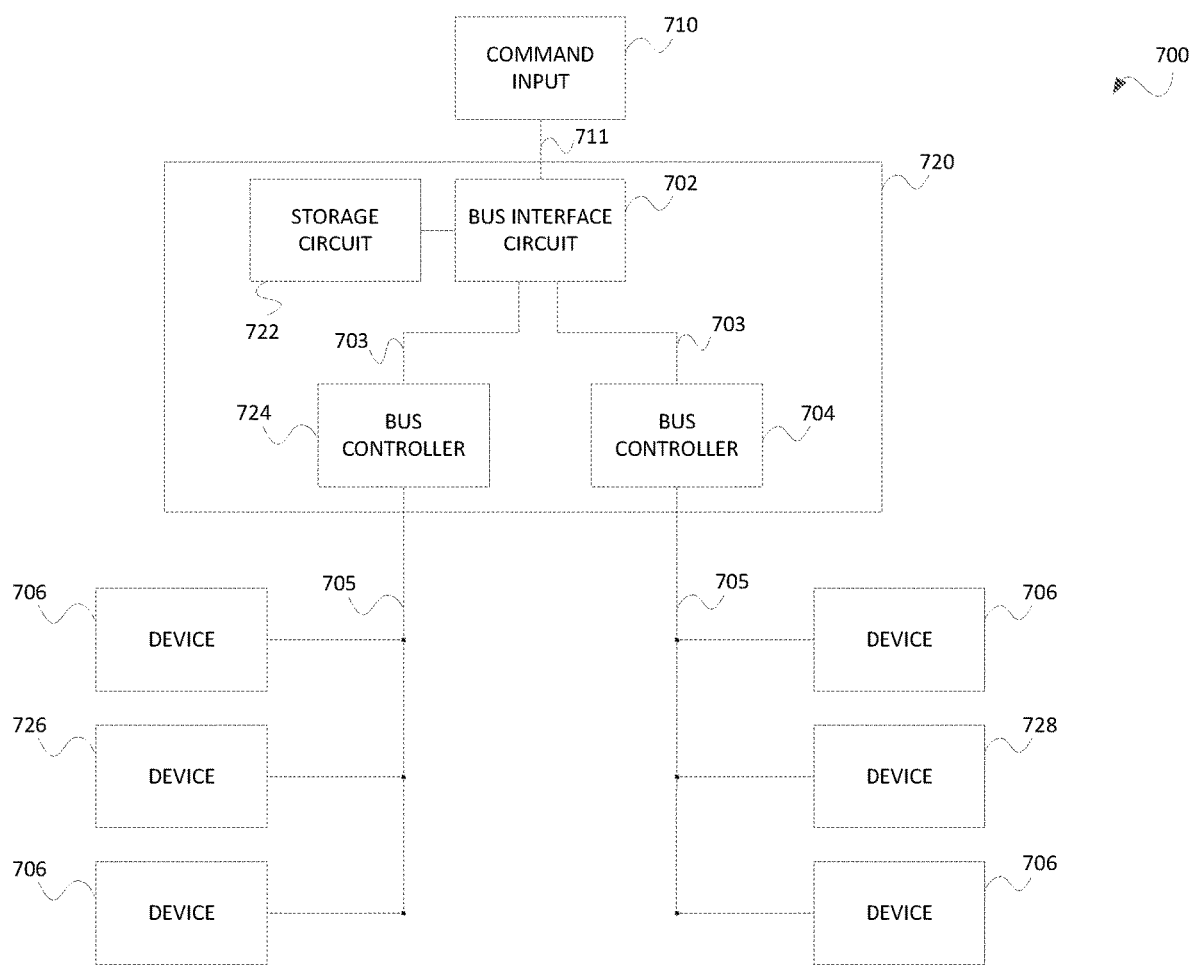
FIG. 7 is a block diagram of a multi-level networked ordnance system according to some embodiments of the present disclosure.

FIG. 7 is a block diagram of a multi-level networked ordnance system 700 according to some embodiments of the present disclosure. The system 700 includes bus interface circuit 702, connections 703, bus controllers 704 and 724, buses 705, ordnance devices 706, 726, and 728, storage circuit 722, command input 710, and connection 711. The bus interface circuit 702, connections 703, bus controllers 704/724, buses 705, and ordnance devices 706/726/728 can be provided substantially as described with respect to the bus interface 202, the connections 203, the bus controllers 204, the buses 205, and the ordnance devices 206, respectively.

The storage circuit 722 can be provided as a hardware and/or software device for storing data. For example, the storage circuit 722 can be provided as a flash memory device, an electronically erasable programmable read-only memory ("EEPROM"), firmware programmed into a read-only memory device, and application-specific integrated circuit, a field-programmable gate array, or in some other form.

The command input 710 can be a hardware and/or software device that transmits commands to the bus interface circuit 702. In some embodiments, the command input 710 can be a control module provided as part of the vehicle or system in which the system 700 is installed. For example, consider a case where the system 700 is installed in a satellite deployment vehicle. In such a case, the command input 710 can be an application-specific integrated circuit that determines when a satellite should be deployed based on the position and trajectory of the vehicle. When the command input 710 determines that a satellite should be deployed (e.g., because the satellite deployment vehicle is at a correct altitude, a correct trajectory, a correct orientation, and a velocity matching the Earth's rotation), the command input 710 can generate a "deploy satellite" command. The command input 710 can transmit the "deploy satellite" command to the bus interface circuit 702 using connection 711. The connection 711 can be an electrical coupling, such as described with respect to connections 203. As another example, upon determining that a satellite should be deployed, the command input 710 can generate a "deploy satellite X" command and transmit that command to the bus interface circuit 702 using connection 711. In such an example, satellite X can be a specific satellite denoted by some identifier, X.

The bus interface circuit 702 can transmit one or more commands to one or more of the bus controllers based on receiving the command from the command input 710. For example, continuing the example from above, if the bus interface circuit 702 receives a "deploy satellite" command form the command input 710, the bus interface circuit 702 can determine a next satellite to be deployed. For instance, the storage circuit 722 can store an ordered list of the ordnance devices 706/726/728 indicating an order in which these ordnance devices should be activated. If each ordnance device is coupled to a satellite, then the ordered list stored by the storage circuit 722 can indicate an order in which satellites coupled to the satellite deployment vehicle should be deployed. Each time the bus interface circuit 702 receives a "deploy satellite" command, the bus interface circuit 702 can select the next ordnance device 706/726/728 from the list stored by the storage circuit 722. The bus interface circuit 702 can determine the next ordnance device 706/726/728 in the ordered list by modifying the ordered list stored by the storage circuit 722 after each received "deploy satellite" command, by storing an index value for the next position in the list in a register of the bus interface circuit 702, or in some other way.

In some embodiments, the entries in the ordered list stored by the storage circuit 722 can be a tuple of the form <bus controller identifier, ordnance device identifier>. The bus controller identifier can be a logical value identifying either bus controller 724 or bus controller 704 (e.g., a one bit value with "0" indicating bus controller 724 and "1" indicating bus controller 704). The ordnance device identifier can be a logical value identifying an ordnance device 706/726/728 attached to the bus 705 for the indicated bus controller 704/724 (e.g., a two bit value with "00" indicating the top-most (as pictured) ordnance device 706 on each bus 705, "01" indicating ordnance devices 726/728, and "10" indicating the bottom-most (as pictured) ordnance device 706 on each bus 706). As an example, if the next entry in the ordered list stored by the storage circuit 722 is <"0", "01">, then the bus interface circuit 702 can determine that an ordnance device 726 with a logical address "01" on the bus 705 for the bus controller 724 should be activated.

As such, the bus controller 702 can transmit a command over connection 703 to the bus controller 724 of the form "activate ordnance device 01." In response to receiving the command from the bus interface circuit 702, the bus controller 724 can transmit a command over the connect bus 705 of the form "activate ordnance device 01." Each of the ordnance devices 706/726 connected to the bus 705 for the bus controller 724 can receive the command over the bus 705. In response to receiving the command, the ordnance device 726 can determine that the logical address "01" indicates itself. In response to this receiving of the command and/or this determining as to the logical address, the ordnance device 726 can activate a pyrotechnic or other device included as part thereof. Where this pyrotechnic device is configured to break a physical coupling between a satellite and the satellite deployment vehicle, the activation of the ordnance device 726 can include a controlled explosion that releases the satellite from the satellite into orbit.

In some embodiments, the storage circuit 722 can store multiple ordered lists or an ordered list with multiple tuples for each entry. For example, the storage circuit 722 can store two ordered lists, one containing an ordering of ordnance devices 706/726 connected to the bus 705 for the bus controller 724, and one containing an ordering of ordnance devices 706/728 connected to the bus 705 for the bus controller 704. In such embodiments, the bus interface circuit 702 can choose the next item for each list after a "deploy satellite" command is received from the command input 710. The bus interface circuit 702 can send two different "activate ordnance" commands based on the two entries selected from the lists (e.g., transmitting "activate ordnance device 01" to bus controller 724 and transmitting "activate ordnance device 01" to bus controller 704). The bus controllers 704 and 724 can then independently receive their respective commands from the bus interface circuit 702, and repeat those commands on their respective buses 705. In such embodiments, multiple ordnance devices 706/726/728 can identify the receipt of self-directed activation commands substantially simultaneously (e.g., each of ordnance devices 726 and 728 identify receipt a command to activate itself), which can cause activation of multiple ordnance devices 706/726/728 substantially simultaneously (e.g., ordnance devices 726 and 728 deploy satellites at the same time). This approach can be advantageous in some embodiments to achieve a force offset, such as by simultaneously deploying multiple satellites symmetrically positioned opposite an axis of symmetry for the satellite deployment vehicle, thereby preventing the satellite deployments from imparting an angular velocity on the satellite deployment vehicle.

In some embodiments, the storage circuit 722 can store a mapping of values. For example, the storage circuit 722 can store a mapping of input values from the command input 710 to output values for the bus controllers 704. For instance, the storage circuit 722 can store a mapping as tuples of the form <external identifier, internal identifier>. The external identifier can be a globally unique identifier for an ordnance device 706/726/728. For instance, the external identifier can be a globally unique identifier (e.g., three bit value) for an ordnance device as used by the command input 710. The internal identifier can be a tuple of the form <bus controller identifier, ordnance device identifier>, as described previously. In such embodiments, the bus interface circuit 702 can receive a command in the form of "deploy satellite X" from the command input 710, wherein "X" is an external identifier value in the mapping stored by the storage circuit 722 (e.g., X could be "001"). In response to receiving the command from the command input 710, the bus interface circuit 702 can select a bus controller 704/724 and an address value for an ordnance device 706/726/728 by looking for an entry in the mapping stored by the storage circuit 722 (e.g., an entry <"001", <"0", "01">>). The bus interface circuit 702 can transmit an activation command and ordnance device address to the selected bus controller 704/724 based on this selection (e.g., transmit "activate ordnance device 01" based on the foregoing parenthetical example and the previous discussion).

Different command values from the command input 710, from the bus interface circuit 702, and from the bus controllers 704/724 can be used in accordance with various embodiments of the present disclosure. Different data storage by the storage circuit 722 can be used in accordance with various embodiments of the present disclosure. Different algorithms for translating a command received from the command input 710 to a command transmitted to a bus controllers 704/724 can be used in accordance with various embodiments of the present disclosure.

In some embodiments, the bus interface circuit 702, the storage circuit 722, the connections 703, and the bus controllers 704/724 can provided as a smart controller device 720. In such embodiments, the smart controller device 722 can include all components provided on a single physical substrate.

Figure 8:
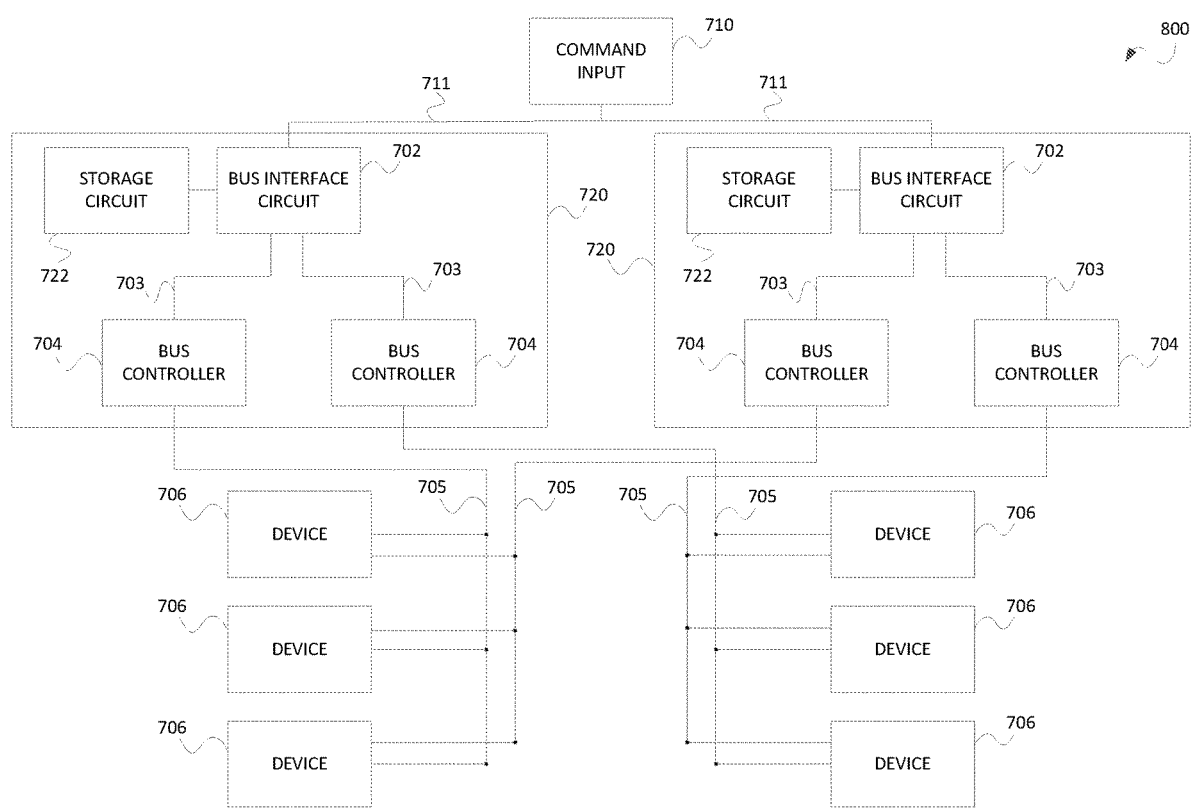
FIG. 8 is a block diagram of a multi-level networked ordnance system according to some embodiments of the present disclosure.

FIG. 8 is a block diagram of a multi-level networked ordnance system 800 according to some embodiments of the present disclosure. The system 800 includes command input 710, connection 711, bus interface circuits 702, storage circuits 722, connections 703, smart controller devices 720, bus controllers 704, buses 705, and ordnance devices 706, as described previously.

In contrast with the system 700 of FIG. 7, the system 800 of FIG. 8 includes redundant versions of each of bus interface circuits 702, storage circuits 722, connections 703, smart controller devices 720, bus controllers 704, buses 705, and ordnance devices 706. In some embodiments, an ordnance device 706 can be configured to activate based on receiving an activation command directed to itself across either or both of the buses 705 to which it is connected. Therefore, the configuration of system 800 can be advantageous where a failsafe operation of the system 800, and the activation of the ordnance devices 706, is desired.

In some embodiments, the redundancy configuration of the system 800 can be provided in different ways. For example, the system 800 can use on a single storage circuit 722 (e.g., to avoid inconsistency in memory state between the redundant components). As another example, the system 800 can use redundant command inputs 710 (e.g., where failure of the command input 710 is a risk). As another example, multiple ordnance devices 706 can correspond to a single pyrotechnic device. In such cases, redundant activation commands can be received by different ordnance devices 706, but the receipt of an activation command by either of the redundant ordnance devices 706 can be effective to cause activation of the pyrotechnic device.

Figure 9:
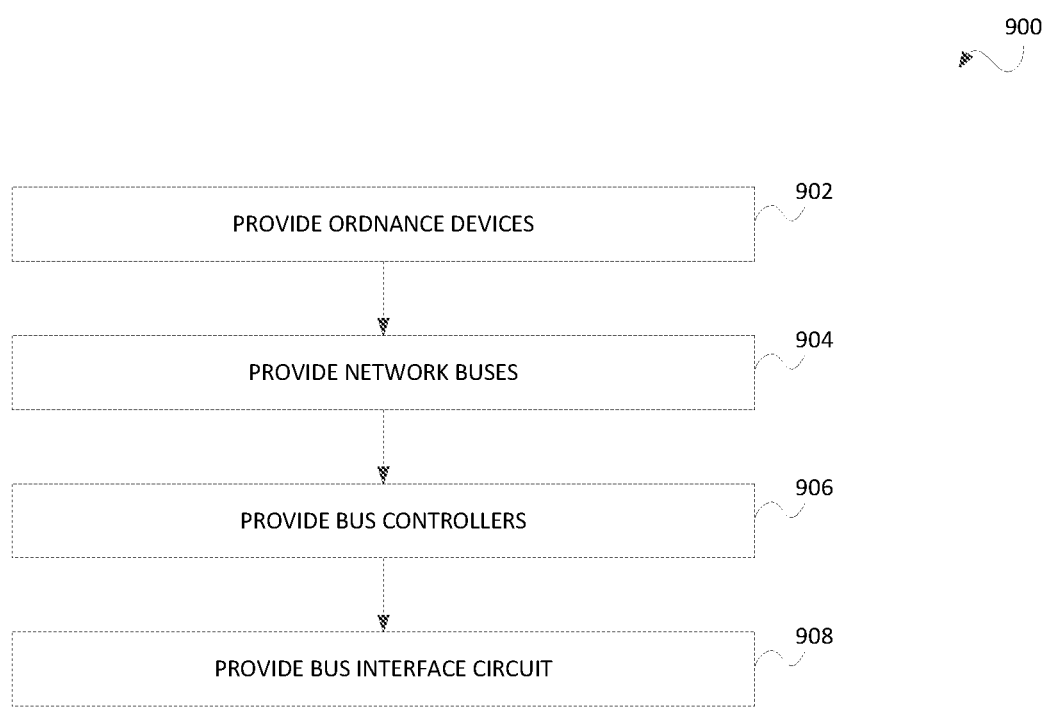
FIG. 9 is a flowchart of a process for providing a multi-level networked ordnance system according to some embodiments of the present disclosure.

FIG. 9 is a flowchart of a process 900 for providing a multi-level networked ordnance system according to some embodiments of the present disclosure.

At block 902, ordnance devices are provided. Block 902 can include providing ordnance devices as described with respect to ordnance devices 206, 706, 726, and 728.

At block 904, network buses are provided. Block 904 can include providing network buses as described with respect to network buses 205 and 705.

At block 906, bus controllers are provided. Block 906 can include providing bus controllers as described with respect to bus controllers 204, 704, and 724.

At block 908, a bus interface circuit is provided. Block 908 can include providing a bus interface circuit as described with respect to bus interface circuits 202 and 702.

Process 900 can be modified consistent with various embodiments of the present disclosure.

Figure 10:
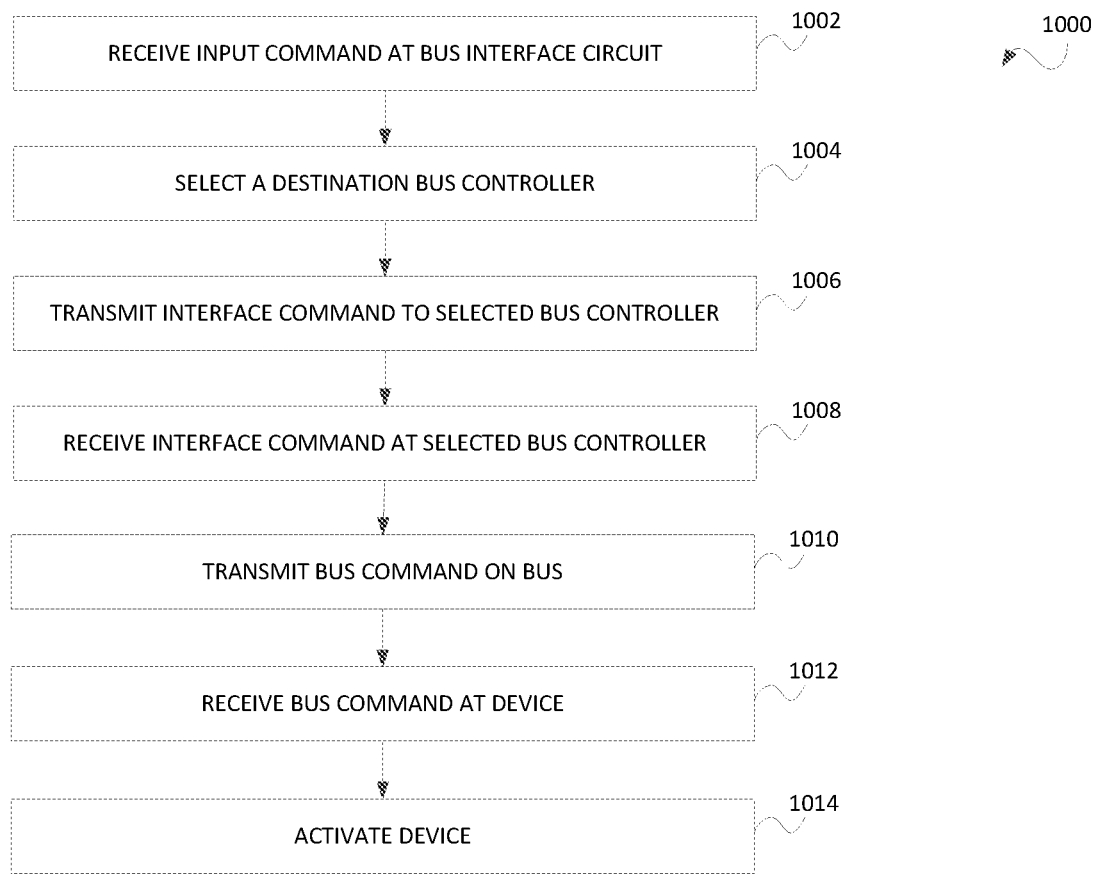
FIG. 10 is a flowchart of a process for operating a multi-level networked ordnance system according to some embodiments of the present disclosure.

FIG. 10 is a flowchart of a process 1000 for operating a multi-level networked ordnance system according to some embodiments of the present disclosure. In some embodiments, the process 1000 can be performed using the multi-level network ordnance systems described herein (e.g., systems 200, 300, 400, 500, 600, 700, and/or 800).

At block 1002, an input command is received at a bus interface circuit. Block 1002 can include receiving a command at a bus interface circuit (e.g., bus interface circuit 202, 702) from a command input (e.g., command input 710). In some embodiments, the input command can specify an action to be taken by an ordnance device. In some embodiments, the input command can specify an action to be taken by an ordnance device (e.g., ordnance devices 206, 706, 726, 728) and a specific ordnance device that should take the action. In some embodiments, the input command can be an activation command.

At block 1004, a destination bus controller is selected. Block 1004 can include selecting a bus controller (e.g., bus controllers 204, 704, 724). Block 1004 can include a bus interface circuit (e.g., bus interface circuit 202, 702) selecting a bus controller. Block 1004 can include a bus interface circuit using data stored in a storage circuit (e.g., storage circuit 722) in order to select a bus controller. Block 1004 can include a bus interface circuit using data stored in a storage circuit and a selection algorithm (e.g., as described previously herein) in order to select a bus controller.

At block 1006, an interface command is transmitted to the selected bus controller. Block 1006 can include transmitting the interface command to the bus controller selected at block 1004. Block 1006 can include transmitting the interface command to a bus controller (e.g., bus controllers 204, 704, 724). Block 1006 can include a bus interface circuit (e.g., bus interface circuit 202, 702) transmitting the interface command. In some embodiments, the interface command can be the same as the input command. In some embodiments, the interface command can specify an action to be taken by an ordnance device (e.g., ordnance devices 206, 706, 726, 728) and a specific ordnance device that should take the action. In some embodiments, the interface command can be an activation command. In some embodiments, the interface command can contain a same action as the input command received at block 1002. In some embodiments, the interface command can contain a same action as the input command received at block 1002, and an address determined by translating an address included in the input command.

At block 1008, the interface command is received at the selected bus controller. Block 1008 can include receiving the interface command transmitted at block 1006. Block 1008 can include receiving the interface at the bus controller selected at block 1004. Block 1006 can include receiving the interface command at a bus controller (e.g., bus controllers 204, 704, 724). Block 1008 can include receiving the interface command from a bus interface circuit (e.g., bus interface circuit 202, 702).

At block 1010, a bus command is transmitted on a bus. Block 1010 can include a bus controller (e.g., bus controllers 204, 704, 724) transmitting the bus command on a bus (e.g., buses 205, 705). Block 1010 can include a bus controller transmitting the bus command on the bus in response to the bus controller receiving the interface command. In some embodiments, the bus command can be the same as the interface command. In some embodiments, the bus command can specify an action to be taken by an ordnance device (e.g., ordnance devices 206, 706, 726, 728) and a specific ordnance device that should take the action. In some embodiments, the bus command can be an activation command. In some embodiments, the bus command can include a logical address value that uniquely identifies an ordnance device on the bus, as with respect to other ordnance devices on the bus.

At block 1012, a bus command is received at a device. Block 1012 can include an ordnance device (e.g., ordnance devices 206, 706, 726, 728) receiving the bus command over a bus (e.g., buses 205, 705). Block 1012 can include receiving the bus command transmitted at block 1010 by the bus controller selected at block 1004.

At bock 1014, a device is activated. Block 1014 can include an ordnance device (e.g., ordnance devices 206, 706, 726, 728) activating. Block 1014 can include an ordnance device firing a pyrotechnic device connected thereto. Block 1014 can include an ordnance device firing a pyrotechnic device provided as part of the ordnance device. Block 1014 can include a device activating in response to receiving the bus command at block 1014. In some embodiments, the device activation of block 1014 can be performed further in response to determining that the bus command received at block 1014 contains a logical address value that identifies the device.

Process 1000 can be modified consistent with various embodiments of the present disclosure.

Figure 11:
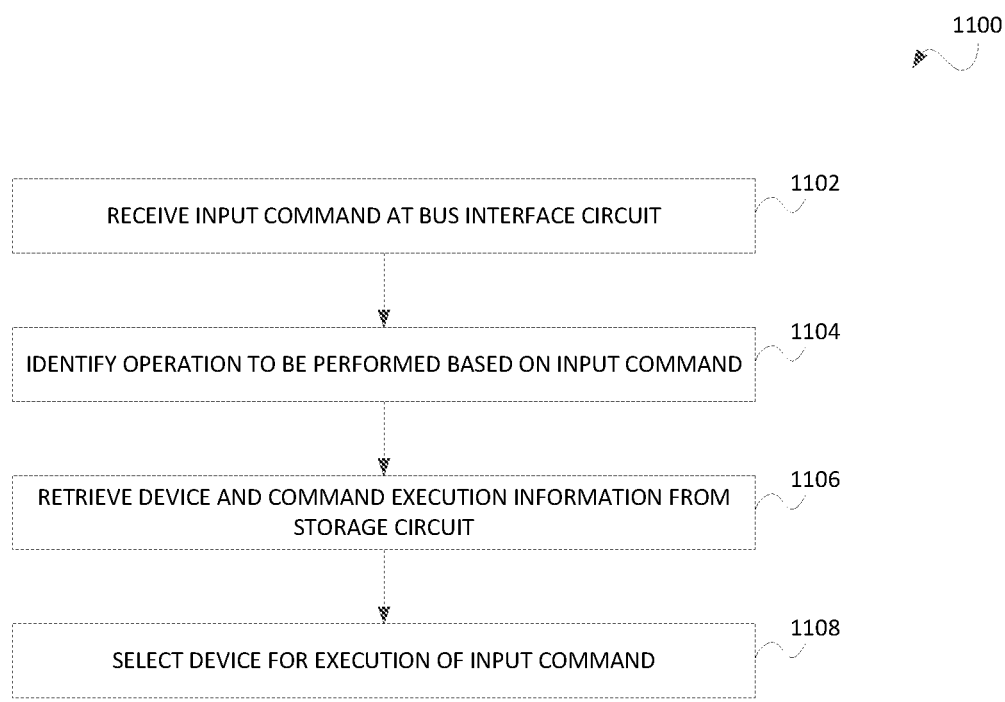
FIG. 11 is a flowchart of a process for operating a multi-level networked ordnance system according to some embodiments of the present disclosure.

FIG. 11 is a flowchart of a process 1100 for operating a multi-level networked ordnance system according to some embodiments of the present disclosure. In some embodiments, the process 1100 can be performed using the multi-level network ordnance systems described herein (e.g., systems 200, 300, 400, 500, 600, 700, and/or 800).

At block 1102, an input command is received at a bus interface. Block 1102 can include a bus interface circuit (e.g., bus interface circuits 202, 702) receiving an input command from a command input device (e.g., command input 710).

At block 1104, an operation to be performed is determined based on the input command. Block 1102 can include a bus interface circuit (e.g., bus interface circuits 202, 702) determining an operation to be performed by an ordnance device (e.g., ordnance devices 206, 706, 726, 728) based on the input command. In some embodiments, the operation to be performed is an activation operation.

At block 1106, device and command execution information is retrieved from a storage circuit. Block 1106 can include a bus interface circuit (bus interface circuits 202, 702) retrieving information from a storage circuit (e.g., storage circuit 722) based on the input command received at block 1102. In some embodiments, the block 1106 can include a bus interface circuit retrieving information about one or more ordnance devices that have already performed the operation identified at block 1104 and/or one or more ordnance devices that are planned to perform the operation identified at block 1104.

At block 1108, a device is selected for execution of the input command. Block 1108 can include a bus interface circuit (bus interface circuits 202, 702) selecting an ordnance device (e.g., ordnance devices 206, 706, 726, 728) to perform the operation identified at block 1104. In some embodiments, block 1108 can include a bus interface circuit selecting the next ordnance device that is to perform the operation.

Process 1100 can be modified consistent with various embodiments of the present disclosure.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A networked electronic ordnance system comprising:
a plurality of bus controllers; and
a bus interface circuit electrically connected to the plurality of bus controllers, the bus interface circuit being configured to transmit commands for pyrotechnic devices connected to the plurality of bus controllers,
wherein the transmitted commands include activation commands to control activation of one or more pyrotechnic devices,
wherein at least one of the plurality of bus controllers is configured to connect to a plurality of pyrotechnic devices via a network bus,
wherein the plurality of pyrotechnic devices are arranged in groups according to thruster stages of a rocket system.

2. The system of claim 1, further comprising:
a storage circuit connected to the bus interface circuit and configured to store information identifying a pyrotechnic device to be activated, the pyrotechnic device connected to one of the plurality of bus controllers.

3. The system of claim 1, wherein the bus interface circuit is further configured to receive an input command from a command source and determine which bus controller of the plurality of bus controllers to which the input command pertains.

4. The system of claim 3, wherein the bus interface circuit is further configured to transmit a command based on the input command to the bus controller corresponding to the input command.

5. The system of claim 3, wherein the determination further includes determining an address value for a pyrotechnic device connected to the bus controller corresponding to the input command.

6. The system of claim 1, wherein each of the plurality of bus controllers are configured to connect to a network bus and configured such that at least two network buses share a logical address space.

7. The system of claim 1, wherein at least one pyrotechnic device connected to a bus controller of the plurality of bus controllers is configured as a firing mechanism for a thruster.

8. The system of claim 1, wherein the groups includes a plurality of stage groups, each stage group corresponding to a separate thruster stage that is used to propel the rocket system.

9. The system of claim 8, wherein each stage group includes a plurality of thruster groups, each thruster group including one or more pyrotechnic device corresponding to a respective individual thruster.

10. The system of claim 8, wherein each stage group is connected to a different bus controller of the plurality of bus controllers.

11. An aerospace vehicle, comprising:
a plurality of pyrotechnic devices, each pyrotechnic device configured as a firing mechanism for a respective thruster to propel the aerospace vehicle; and
a networked electronic ordnance system comprising:
a plurality of bus controllers, and
a bus interface circuit electrically connected to the plurality of bus controllers, the bus interface circuit being configured to transmit commands for one or more pyrotechnic devices of the plurality of pyrotechnic devices connected to the plurality of bus controllers,
wherein the transmitted commands include activation commands to control activation of the one or more pyrotechnic devices of the plurality of pyrotechnic devices,
wherein each of the plurality of bus controllers is configured to connect to a pyrotechnic device of the plurality of pyrotechnic devices via a network bus, and
wherein the plurality of pyrotechnic devices are arranged in groups according to thruster stages of the aerospace vehicle.

12. The aerospace vehicle of claim 11, further comprising:
a storage circuit connected to the bus interface circuit, wherein the storage circuit is configured to store information identifying the pyrotechnic device of the plurality of pyrotechnic devices.

13. The aerospace vehicle of claim 11, wherein the bus interface circuit is further configured to receive an input command from a command source and determine which bus controller of the plurality of bus controllers to which the input command pertains.

14. The aerospace vehicle of claim 13, wherein the bus interface circuit is further configured to transmit a command based on the input command to the bus controller corresponding to the input command.

15. The aerospace vehicle of claim 13, wherein the determination further includes determining an address value for a pyrotechnic device connected to the bus controller corresponding to the input command.

16. The aerospace vehicle of claim 11, wherein each of the plurality of bus controllers is configured to connect to a network bus and configured such that at least two network buses share a logical address space.

17. The aerospace vehicle of claim 11, wherein the groups include a plurality of stage groups, each stage group corresponding to a separate thruster stage that is used to propel the aerospace vehicle.

18. The aerospace vehicle of claim 17, wherein each stage group includes a plurality of thruster groups, each thruster group including one or more pyrotechnic devices with each pyrotechnic device corresponding to a respective individual thruster.

19. The aerospace vehicle of claim 17, wherein the plurality of stage groups includes a first stage group corresponding to a first-stage thruster of the aerospace vehicle and a second stage group corresponding to a second-stage thruster of the aerospace vehicle.

20. The aerospace vehicle of claim 19, wherein the first stage group is connected to a first bus controller of the plurality of bus controllers and the second stage group is connected to a second bus controller of the plurality of bus controllers.

* * * * *